United States Patent [19]

Sunohara et al.

[11] Patent Number: 5,307,187
[45] Date of Patent: Apr. 26, 1994

[54] LIQUID CRYSTAL ELEMENT WITH HIGHER RESISTIVITY IN THE ENCAPSULATION MEDIUM THAN IN THE LIQUID CRYSTAL

[75] Inventors: Kazuyuki Sunohara, Yokohama; Koichiro Shirota, Kawasaki; Kenji Sano, Tokyo, all of Japan

[73] Assignee: Kabushiki Kaisha Toshiba, Kawasaki, Japan

[21] Appl. No.: 904,680

[22] Filed: Jun. 26, 1992

[30] Foreign Application Priority Data

Jun. 28, 1991 [JP] Japan .................................. 3-158462

[51] Int. Cl.$^5$ .............................................. G02F 1/13
[52] U.S. Cl. ........................................ 359/51; 359/99; 359/52
[58] Field of Search .................... 359/51, 52, 50, 99, 359/103; 428/1

[56] References Cited

U.S. PATENT DOCUMENTS

| | | | |
|---|---|---|---|
| 4,671,618 | 6/1987 | Wu et al. | 359/52 |
| 4,673,255 | 6/1987 | West et al. | 359/51 |
| 4,701,024 | 10/1987 | Kobayashi et al. | 359/51 |
| 5,082,351 | 1/1992 | Fergason | 359/51 |
| 5,096,282 | 3/1992 | Margerum et al. | 359/51 X |
| 5,103,327 | 4/1992 | Hirai et al. | 359/51 |
| 5,138,472 | 8/1992 | Jones et al. | 359/52 |

FOREIGN PATENT DOCUMENTS

| | | |
|---|---|---|
| 58-501631 | 9/1983 | Japan . |
| 61-502128 | 9/1986 | Japan . |
| WO91/01511 | 2/1991 | PCT Int'l Appl. . |

OTHER PUBLICATIONS

Database WPIL, No. 91-136 000, & JP-A-03-072 317, Mar. 27, 1991, "Liquid Crystal Display Device Driven With Low Voltage-Comprises Polymer Layer(s) Held By Transparent Conductive Substrates".

Database WPIL, No. 89-351 903, & JP-A-01-262 530, Oct. 19, 1989, "Liquid Crystal Display Element-Has Cholesteric Liquid Crystals Dispersed In Granular Form In Polymer Layer Held Between Pair Of Display Electrodes".

*Primary Examiner*—William L. Sikes
*Assistant Examiner*—Kenneth Parker
*Attorney, Agent, or Firm*—Oblon, Spivak, McClelland, Maier & Neustadt

[57] ABSTRACT

A liquid crystal display element comprises a liquid crystal material having a resistivity $\rho_{LC}$ ($\Omega$·cm) and a polymer matrix material having a resistivity $\rho_p$ ($\Omega$·cm). The ratio $\rho_{LC}/\rho_p$ is defined to fall within a range of between 1 and $10^5$ ($1 \leq \rho_{LC}/\rho_p \leq 10^5$). Also, the particles diameters of the polymer matrix material or the liquid crystal material are distributed such that at least two peaks each having a half value width of at least 0.5 $\mu$m are present within a range of between 0.5 $\mu$m and 2.5 $\mu$m. Further, a protective layer is formed to cover the outer surface of the liquid crystal material. The particular construction permits manufacturing a polymer dispersion type liquid crystal display element, which exhibits a high response speed, which can be operated with a low driving voltage, and which permits a high contrast.

11 Claims, 1 Drawing Sheet

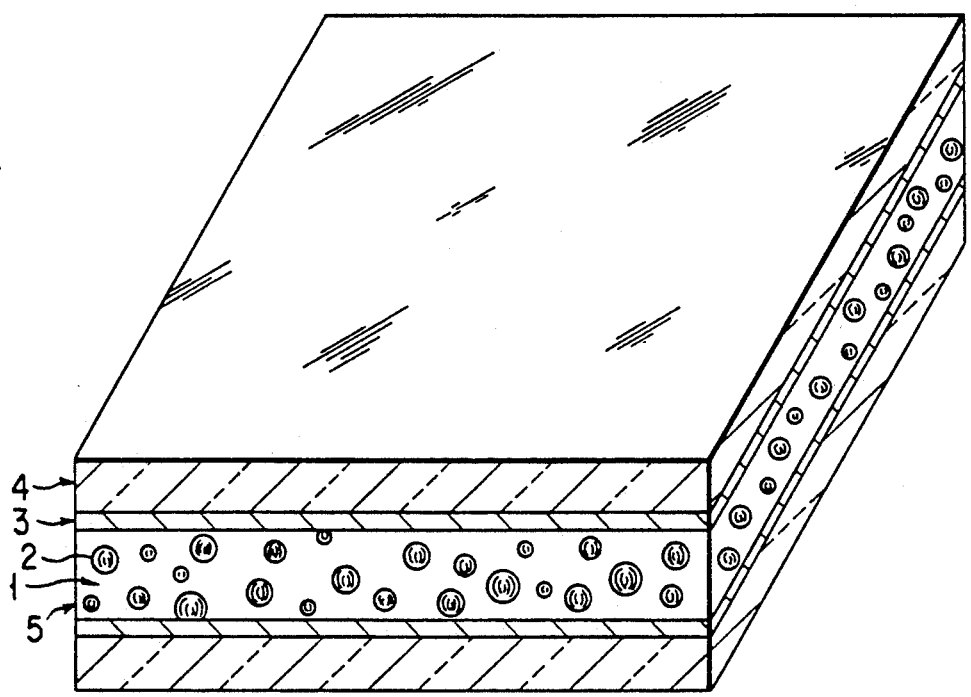
F I G. 1

LIQUID CRYSTAL ELEMENT WITH HIGHER RESISTIVITY IN THE ENCAPSULATION MEDIUM THAN IN THE LIQUID CRYSTAL

BACKGROUND OF THE INVENTION

1. Field of the Invention

The present invention relates to a polymer dispersion type liquid crystal display element useful as, for example, a TV or flat panel display device.

2. Description of the Related Art

Recently, a polymer dispersion type liquid crystal display element attracts attentions as a new type liquid crystal display element. The new type liquid crystal display element, which was disclosed for the first time in Published Unexamined Japanese Patent Application No. 61-83519, is constructed such that a film prepared by dispersing a liquid crystal material in a polymer matrix material is held between a pair of electrodes.

In the polymer dispersion type liquid crystal display element, the liquid crystal material dispersed in the polymer matrix material differs in the refractive index from the polymer matrix material, when an electric field is not applied across the film held between the two electrodes. As a result, scattering of light is brought about so as to make the film opaque. When an electric field is applied across the film by applying voltage between the two electrodes, the liquid crystal molecules dispersed in the polymer matrix material are oriented, with the result that the refractive index of the oriented portion of the liquid crystal is made substantially equal to that of the polymer matrix material. It follows that the film is made transparent.

The polymer dispersion type liquid crystal display element, which utilizes the particular operation principle described above, makes it unnecessary to use a polarizer, an orientation film, etc., which are required in the conventional TN type liquid crystal display element used in, for example, a miniature TV receiver. It follows that it is possible to markedly simplify the manufacturing process of the polymer dispersion type liquid crystal display element. In the conventional polymer dispersion type liquid crystal display element, however, the polymer matrix material has a relatively high resistivity, leading to requirement of a high driving voltage. Also, the conventional liquid crystal display element of this type is low in its response speed. Further, the light shuttering function is performed by the scattering of light, leading to a low contrast.

SUMMARY OF THE INVENTION

An object of the present invention is to provide a liquid crystal display element, which can be operated with a low driving voltage, which exhibits a high response speed, and which achieves a good contrast.

According to a first embodiment of the present invention, there is provided a liquid crystal display element, having two substrates and a film held between the two substrates, the film being made of a material prepared by dispersing a liquid crystal material in a polymer matrix material, and a ratio $\rho_{LC}/\rho_p$ falling within a range of between 1 and $10^5$, i.e., $1 \leq \rho_{LC}/\rho_p \leq 10^5$, where $\rho_{LC}$ denotes the resistivity ($\Omega\cdot cm$) of the liquid crystal material, and $\rho_p$ represents the resistivity ($\Omega\cdot cm$) of the polymer matrix material.

According to a second embodiment of the present invention, there is provided a liquid crystal display element, having two substrates and a film held between the two substrates, the film being made of a material prepared by dispersing a liquid crystal material in a polymer matrix material, at least two peaks each having a half value width of at least 0.5 $\mu m$ being present within a range of between 0.5 $\mu m$ and 2.5 $\mu m$ in terms of the particle size distribution of each of the polymer matrix material and the liquid crystal material.

Further, according to a third embodiment of the present invention, there is provided a liquid crystal display element, having two substrates and a film held between the two substrates, the film being made of a material prepared by dispersing a liquid crystal material in a polymer matrix material, and a protective layer being formed to cove the outer surface of the liquid crystal particle.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a schematic view main portion of a liquid crystal showing display element of the present invention.

DETAILED DESCRIPTION OF THE PREFERRED EMBODIMENTS

In the first embodiment of the present invention, the electrical conductivity of the polymer matrix material used in a polymer dispersion type liquid crystal display element is adjusted so as to permit a ratio in resistivity of the liquid crystal material to the polymer matrix material, i.e., the ratio, $\rho_{LC}/\rho_p$, to fall within a predetermined range, i.e., $1 < \rho_{LC}/\rho_p < 10^5$. For allowing the ratio $\rho_{LC}/\rho_p$ to fall within the predetermined range noted above, electrically conductive fine particles may be added to or dispersed in a polymer matrix material. Fine particles of metal oxides such as aluminum, metal such as silver, copper; carbon such as graphite; fullerenes such as $C_{60}$, $C_{78}$; charge-transfer complex, for example, a substance obtained by using hydrazone compounds, styryl compounds or compounds bonded diethylamino group or dimethylamino group thereto as a donor, and by using tetracyanoethane, tetracyanoquinodiethane, or maleic anhydride as an acceptor; organic electrolyte such as tetrabuthylammonium chloride or tetraethylammonium perchlorate can be used in the present invention as conductive fine particles. It is desirable for the conductive fine particles to have an average particle diameter of 0.01 to 3 $\mu m$. If the average diameter is smaller than 0.01 $\mu m$, it is difficult to control the particle diameter in the manufacture process. On the other hand, if the average diameter of the conductive fine particles is larger than 3 $\mu m$, the display quality is degraded. The amount of the conductive fine particles used in the present invention is not particularly restricted, as far as the ratio $\rho_{LC}/\rho_p$ falls within the range defined in the present invention.

It is also possible to put conductive fine particles in microcapsules which are immiscible with the liquid crystal material used. In this case, the microcapsules thus prepared are dispersed in the polymer matrix material. It should be noted that conductive fine particles, if mixed with a liquid crystal material, tend to impair the operation characteristics of the liquid crystal material. For avoiding the difficulty, it is desirable to put conductive fine particles in microcapsules immiscible with the liquid crystal material and disperse the microcapsules thus prepared in the polymer matrix material.

Alternatively, conductive polymers may be added to or dispersed in a polymer matrix material to permit the ratio $\rho_{LC}/\rho_p$ to fall within the range specified in the present invention. Incidentally, where the polymer itself used exhibits an electrical conductivity, it is possible to use the conductive polymer as the polymer matrix material. In this case, it is unnecessary to apply any treatment to the conductive polymer.

The conductive polymers used in the present invention include, for example, conjugated $\pi$ aromatic polymer, polypyrrole, poly (N-substituted dipyrroe), poly (3,4-2 substituted pyrrole), polypyridine, polyphenylene, polythiophene, poly (3,4-2 substituted thiophene), polyaniline, polyazulene, polyvinylene, polyvinylcarbazol, poly (N-substituted carbazol), polyselenophene, polyfuran, poly (2,5-furylenevinylene), polybenzothiophene, poly (2,5-thienylenevinylene), polybenzofuran, polyindole, polyisothionatphthene, polypyridazine, polyacetylene, and polysilane. The content of the conductive polymer is not particularly restricted as far as the ratio $\rho_{LC}/\rho_p$ falls within the range specified in the present invention.

In the present invention, it is desirable for the ratio $\rho_{LC}/\rho_p$ to fall within a range of between 1 and $10^5$ If the ratio is smaller than 1, the electric field in liquid crystal phase is weak. On the other hand, if the ratio is larger than $10^5$, the conductivity of liquid crystal phase is large in excess. If the resistivity $\rho_p$ of the polymer matrix material whose resistivity has been adjusted exceeds $10^{10}$ $\Omega\cdot$cm, a satisfactory effect cannot be expected. On the other hand, if the resistivity $\rho_p$ is lower than $10^{-4}$ $\Omega\cdot$cm, the polymer matrix material exhibits a unduly high electrical conductivity, making it impossible to apply an electric field to the liquid crystal phase.

In the second embodiment of the present invention, the size (or particle size distribution) of the polymer matrix material or the particle size distribution of the liquid crystal material is defined so as to control the threshold value. Where the particle size distribution is defined as specified in the present invention, a change in the light transmittance relative to the applied voltage is renderd relatively moderate and linear so as to improve the steepness. Further, the particle size distribution specified in the present invention makes it possible to provide a polymer dispersion type liquid crystal display element adapted for the active-matrix driving.

To be more specific, the particle size distribution of the polymer matrix material or the liquid crystal material is defined in the present invention such that at least two peaks each having a half value width of at least 0.5 $\mu$m are present within a range of between 0.5 $\mu$m and 2.5 $\mu$m in the particle diameter. It is important for a plurality of peaks to be present within a range of between 0.5 $\mu$m and 2.5 $\mu$m. If the particles of the polymer matrix material are unduly large, the number of light scatterings is diminished, leading to a low light scattering capability. On the other hand, if the particles of the polymer matrix material are unduly small, the particle diameters overlap with the wavelength region of the visible light. In this case, the scattering of light is suppressed, also leading to a low light scattering capability. In addition, the threshold voltage is increased if the particles of the polymer matrix material are unduly small. It is desirable for at least 80% of the particles to have particle diameters falling within the range of between 0.5 $\mu$m and 2.5 $\mu$m because of optimizing the width of driving voltage. A similar situation takes place where the amount of the liquid crystal material is small relative to the amount of the polymer matrix material such that the liquid crystal molecules are dispersed in the polymer matrix material. It should be noted that, where only one peak is present within the range of the particle diameter noted above, a difficulty is brought about that the relationship between voltage and transmittance can not be controlled. Likewise, where the half value width of the peak is smaller than 0.5 $\mu$m, a difficulty is brought about that the relationship between voltage and transmittance can not be controlled.

The particle size distribution of the polymer matrix material can be controlled by changing the condition of the polymerization. For example, where a thermosetting resin such as an epoxy resin is used as the polymer matrix material, the particle size distribution of the polymer matrix material can be controlled by adjusting the curing temperature and curing time. To be more specific, the particle diameter of the formed polymer matrix material is diminished with increase in the curing temperature and with decrease in the curing time. The particle diameters of the polymer matrix material can be made nonuniform by controlling the curing treatment such that, in the initial stage, a heat treatment is carried out at a low temperature for a relatively long time, followed by elevating the curing temperature for finishing the heat treatment.

Where a photo-setting resin such as an acrylic resin is used as the polymer matrix material, the particle diameters of the polymer matrix material can be controlled by adjusting the curing temperature and the UV energy, as in the case of using an epoxy resin as the polymer matrix material. A polymer matrix material having a wide particle size distribution can be obtained by controlling the curing condition such that, in the initial stage, a UV irradiation is carried out under a low temperature, followed by elevating the temperature before completion of the curing treatment while continuing a UV irradiation.

In the third embodiment of the present invention, the outer surface of the liquid crystal material is covered with a protective layer. To be more specific, the liquid crystal material is put first into microcapsules and, then, the microcapsules thus prepared are dispersed in the polymer matrix material.

A surfactant series monomer can be used as the material of the protective layer. For example, sodium undecylenate can be used as the material of the protective layer. To be more specific, the surfactant series monomers are polymerized so as to form the protective layer. For example, a mixture consisting of a liquid crystal material and a surfactant series monomer is vigorously stirred and dispersed within water so as to form a layer of the surfactant series monomer in a manner to cover the outer surface of the liquid crystal molecule. Under this condition, a polymerization initiating agent is added to the system, with the result that the monomer layer is polymerized so as to form a microcapsule. The microcapsules thus prepared can be filtered, washed with water, dried, and preserved. The microcapsules can be dispersed in an optional polymer matrix material after applying a suitable treatment to the microcapsule thus obtained or intact. The dispersion means is not particularly restricted in the present invention, though it is desirable to use, for example, an ultrasonic wave. Incidentally, it is desirable to disperse the microcapsules under the condition that the polymer of the microcapsule is not dissolved.

The polymerization film thus obtained produces a strong anchoring effect relative to the polymer matrix material unlike the conventional liquid crystal phases which lack an affinity and are formed under a mutually repelling condition. As a result, decay speed of the element is improved in non-application-voltage state.

It is of course possible to employ the first to third embodiments described above in combination so as to provide a satisfactory liquid crystal display element.

The polymers used in the present invention as the polymer matrix material include, for example, polyethylene, polypropylene, polybutylene, polystyrene, polyvinyl acetate, polyvinyl chloride, polyvinylidene chloride, polyacrylic ester, polymethacrylic ester polyacrylonitrile, polyvinyl ether, polyvinyl ketone, polyether, polycarbonate, polyester, polyamide, polyvinyl alcohol, diene series polymer, polyurethane series polymer, silicone resin, natural rubber, modified celluloses such as methyl cellulose and ethyl cellulose, phenoxy resin, phenol resin, epoxy resin, photo-setting resin, melamine resin, polyimide resin, polysilane, copolymers thereof, mixture of these polymers, and polymer alloy.

EXAMPLE 1

Transparent conductive fine particles W-1 (trade name of particles containing tin oxide and manufactured by Mitsubishi Material Inc.), were added in an amount of 0.2% by weight to polycarbonate (manufactured by Aldrich Inc.) used as a polymer matrix material. The fine conductive particles were sufficiently dispersed in the polymer matrix material so as to obtain a mixture exhibiting a resistivity of $10^8$ $\Omega \cdot$cm ($\rho_{LC}/\rho_p = 125$). The mixture was dissolved in chloroform. Further, a liquid crystal 2293 (trade name of a liquid crystal material manufactured by Merk Inc.) was added to the solution such that the ratio of the polymer matrix material to the liquid crystal material was 1:1, followed by evaporating the solvent so as to obtain a film. FIG. 1 shows the main portion of the liquid crystal display element. The film 5 thus prepared was held between a pair of glass substrates 4 each covered with an ITO film 3 formed by means of vapor deposition so as to prepare a polymer dispersion type liquid crystal display cell having a film thickness of 10 μm. In FIG. 1, 1 denotes a polymer matrix, 2 denotes dispersion type liquid crystal. The driving voltage and the response speed of the polymer dispersion type liquid crystal display cell thus prepared were measured by utilizing the transmittance of while light through the cell. It has been found that the rising (0 to 90%) was achieved in 5 mS, and the decay (100 to 10%) was achieved in 3 mS. Also, the driving voltage was found to be 8V.

An additional experiment was conducted substantially as above, except that the transparent conductive fine particles W-1 were formed into microcapsules by using, for example, sodium undecylenate and the microcapsules thus prepared were mixed with the polymer matrix material so as to prepare a film. The film thus prepared was held between a pair of glass substrates each covered with an ITO film formed by means of vapor deposition so as to prepare a polymer dispersion type liquid crystal display cell having a film thickness of 10 μm. The driving voltage and the response speed of the polymer dispersion type liquid crystal display cell thus prepared were measured as in Example 1. Obtained were the rising speed and the decaying speed substantially equal to those in Example 1.

Control 1

A polymer dispersion type liquid crystal display cell was prepared substantially as in Example 1, except that the transparent conductive fine particles were not used for forming the film held between the two glass substrates. Also, the driving voltage and the response speed of the cell were measured as in Example 1.

It has been found that the rising time (0 to 90%) was as much as 50 mS, and the decaying time (100 to 10%) was as much as 40 mS. Further, the driving voltage was found to be 10V. It follows that the cell prepared in Control 1 was markedly lower in response speed than the cell of Example 1. Also, the driving voltage for Control 1 was found higher than that in Example 1.

EXAMPLE 2

Transparent conductive fine particles W-10 (trade name of particles containing tin oxide and manufactured by Mitsubishi Material Inc.), were added in an amount of 0.1% by weight to polycarbonate (manufactured by Aldrich Inc.) used as a polymer matrix material. The fine conductive particles were sufficiently dispersed in the polymer matrix material so as to obtain a mixture exhibiting a resistivity of $10^8$ $\Omega \cdot$cm ($\rho_{LC}/\rho_p = 600$). The mixture was dissolved in chloroform. Further, a liquid crystal ZLI2293 (trade name of a liquid crystal material manufactured by Merk Inc.) was added to the solution such that the ratio of the polymer matrix material to the liquid crystal material was 4:6, followed by evaporating the solvent so as to obtain a film. The film thus prepared was held between a pair of glass substrates each covered with an ITO film formed by means of vapor deposition so as to prepare a polymer dispersion type liquid crystal display cell having a film thickness of 10 μm. The driving voltage and the response speed of the polymer dispersion type liquid crystal display cell thus prepared were measured as in Example 1. It has been found that the rising (0 to 90%) was achieved in 6 mS, and the decay (100 to 10%) was achieved in 3 mS. Also, the driving voltage was found to be 8V.

Control 2

A polymer dispersion type liquid crystal display cell was prepared substantially as in Example 2, except that the transparent conductive fine particles were not used for forming the film held between the two glass substrates. Also, the driving voltage and the response speed of the cell were measured as in Example 2.

It has been found that the rising time (0 to 90%) was as much as 50 mS, and the decaying time (100 to 10%) was as much as 40 mS. Further, the driving voltage was found to be 10V. It follows that the cell prepared in Control 2 was markedly lower in response speed than the cell of Example 2. Also, the driving voltage for Control 2 was found higher than that in Example 2.

EXAMPLE 3

Polyvinyl carbazol used as a conductive polymer was dissolved in chloroform. Then, a liquid crystal ZLI2293 manufactured by Merk Inc. was added to the resultant solution such that the mixing ratio of the polymer matrix material to the liquid crystal material was 2:8, followed by evaporating the solvent so as to prepare a film. Further, the film thus prepared was held between a pair of glass substrates each having an ITO film formed thereon by means of vapor deposition so as to prepare a polymer dispersion type liquid crystal display cell having a film thickness of 10 $\mu m$ ($\rho_{LC}/\rho_p = 430$). The driving voltage and the response speed of the polymer dispersion type liquid crystal display cell thus prepared were measured as in Example 1.

It has been found that the rising (0 to 90%) was achieved in 10 mS, and the decay (100 to 10%) was achieved in 15 mS. Also, the driving voltage was found to be 8V.

EXAMPLE 4

A mixture was prepared first by using 100 parts by weight of Epon 812 (registered trademark of an epoxy resin manufactured by Yuka Shell Inc.), which was used as a polymer matrix material, 100 parts by weight of Capcure 3-800 (trade name of a curing agent manufactured by Yuka Shell Inc.), and 200 parts by weight of E-7 (registered trademark of a liquid crystal manufactured by BDH Inc.). On the other hand, two glass substrates each having an ITO film formed on the surface by means of vapor deposition were disposed to face each other with a spacer of 20 $\mu m$ interposed therebetween, and the resin mixture noted above was filled into the free space between the two glass substrates. The resultant assembly was subjected to a heat treatment at 60° C. for 30 minutes, followed by elevating the temperature to 100° C. for an additional heat treatment for 10 minutes so as to obtain a polymer dispersion type liquid crystal display cell. The particle size of the polymer matrix material was found to be distributed such that two peaks each having a half value width of 1.0 $\mu m$ were included within a range of between 1.0 $\mu m$ and 2.0 $\mu m$.

The contrast and the response speed of the polymer dispersion type liquid crystal display cell thus obtained were measured, with the result that the contrast was satisfactory, i.e., $V_{10}/V_{90}$ was 0.30, and the rising (0 to 90%) was also satisfactory.

EXAMPLE 5

Two kinds of resins, i.e., Epon 812 and Devcon 5A (registered trademark of an epoxy resin manufactured by Devcon Inc.) were used as the polymer matrix material. A curing agent Capcure 3-800 was added to these resins such that the weight ratio of Epon 812 : Devcon 5A : Capcure 3-800 was 1:1:2. Further, a liquid crystal E-7 was added to the resultant mixture such that the weight ratio of the resin mixture to the liquid crystal was 1:2.

On the other hand, two glass substrates each having an ITO film formed on the surface by means of vapor deposition were disposed to face each other with a spacer of 20 $\mu m$ interposed therebetween, and the resin mixture noted above was filled into the free space between the two glass substrates. The resultant assembly was subjected to a heat treatment at 50° C. for 20 minutes, followed by elevating the temperature to 90° C. for an additional heat treatment for 5 minutes so as to obtain a polymer dispersion type liquid crystal display cell. The particle size of the polymer matrix material was found to be distributed such that two peaks each having a half value width of 1.0 $\mu m$ were included within a range of between 1.3 $\mu m$ and 2.0 $\mu m$.

The contrast and the response speed of the polymer dispersion type liquid crystal display cell thus obtained were measured, with the result that the contrast was satisfactory, i.e., $V_{10}/V_{90}$ was 0.25, and the rising (0 to 90%) was also satisfactory.

EXAMPLE 6

A raw material mixture was prepared first by mixing 100 parts by weight of a polymer matrix material consisting of polyesterpolyol and polyurethane acrylate prepared from hydroxypropyl acrylate, 400 parts by weight of a liquid crystal E-7, and 40 parts by weight of 2-hydroxy-2-methyl-1-phenylpropane-1-one, which was used as a photopolymerization initiator. Then, two glass substrates each having an ITO film formed on the surface by means of vapor deposition were disposed to face each other with a spacer of 10 $\mu m$ interposed therebetween, and the resin mixture noted above was filled into the free space between the two glass substrates. The resultant assembly was irradiated for 3 minutes with an ultraviolet light emitted from a metal halide lamp under the condition of 30 W/cm, 80° C., followed by an additional irradiation for 3 minutes with an ultraviolet light emitted from a metal halide lamp under the condition of 30 W/cm, 90° C., so as to prepare a polymer dispersion type liquid crystal display cell. The particle size of the polymer matrix material was found to be distributed such that two peaks each having a half value width of 0.6 $\mu m$ were included within a range of between 0.8 $\mu m$ and 1.7 $\mu m$.

The contrast and the response speed of the polymer dispersion type liquid crystal display cell thus obtain were measured, with the result that the contrast was satisfactory, i.e., $V_{10}/V_{90}$ was 0.25, and the rising (0 to 90%) was also satisfactory.

EXAMPLE 7

A raw material mixture was prepared first by mixing 100 parts by weight of a polymer matrix material consisting of polyesterpolyol and polyurethane acrylate prepared from hydroxypropyl acrylate, 400 parts by weight of a liquid crystal E-7, and 20 parts by weight of 2-hydroxy-2-methyl-1-phenylpropane-1-one, which was used as a photopolymerization initiator. Then, two glass substrates each having an ITO film formed on the surface by means of vapor deposition were disposed to face each other with a spacer of 10 $\mu m$ interposed therebetween, and the resin mixture noted above was filled into the free space between the two glass substrates. The resultant assembly was irradiated for 3 minutes with an ultraviolet light emitted from a metal halide lamp under the condition of 20 W/cm, 60° C., followed by an additional irradiation for 3 minutes with an ultraviolet light emitted from a metal halide lamp under the condition of 80 W/cm, 80° C., so as to prepare a polymer dispersion type liquid crystal display cell. The particle size of the polymer matrix material was found to be distributed such that two peaks each having a half value width of 1.5 $\mu m$ were included within a range of between 1.0 $\mu m$ and 2.0 $\mu m$.

The contrast and the response speed of the polymer dispersion type liquid crystal display cell thus obtained were measured, with the result that the contrast was satisfactory, i.e., $V_{10}/V_{90}$ was 0.20, and the rising (0 to 90%) was also satisfactory.

EXAMPLE 8

A raw material mixture was prepared first by mixing 100 parts by weight of a polymer matrix material consisting of polyesterpolyol and polyurethane acrylate prepared from hydroxypropyl acrylate, 400 parts by weight of E-44 (registered trademark of a liquid crystal manufactured by BDH Inc.), and 20 parts by weight of 2-hydroxy-2-methyl-1-phenylpropane-1-one, which was used as a photopolymerization initiator. Then, two glass substrates each having an ITO film formed on the surface by means of vapor deposition were disposed to face each other with a spacer of 10 μm interposed therebetween, and the resin mixture noted above was filled into the free space between the two glass substrates. The resultant assembly was irradiated for 3 minutes with an ultraviolet light emitted from a metal halide lamp under the condition of 30 W/cm, 60° C., followed by an additional irradiation for 3 minutes with an ultraviolet light emitted from a metal halide lamp under the condition of 80 W/cm, 80° C., so as to prepare a polymer dispersion type liquid crystal display cell. The particle size of the polymer matrix material was found to be distributed such that two peaks each having a half value width of 1.5 μm were included within a range of between 1.5 μm and 2.0 μm.

The contrast and the response speed of the polymer dispersion type liquid crystal display cell thus obtained were measured, with the result that the contrast was satisfactory, i.e., $V_{10}/V_{90}$ was 0.20, and the rising (0 to 90%) was also satisfactory.

EXAMPLE 9

A raw material mixture was prepared first by mixing two kinds of polymer matrix materials, i.e., 100 parts by weight of n-butyl acrylate and 200 parts by weight of acrylic oligomer, 400 parts by weight of E-44, and 10 parts by weight of 2-hydroxy-2-methyl-1-phenylpropane-1-one, which was used as a photopolymerization initiator. Then, two glass substrates each having an ITO film formed on the surface by means of vapor deposition were disposed to face each other with a spacer of 10 μm interposed therebetween, and the resin mixture noted above was filled into the free space between the two glass substrates. The resultant assembly was irradiated for 3 minutes with an ultraviolet light emitted from a metal halide lamp under the condition of 20 W/cm, 60° C., followed by an additional irradiation for 3 minutes with an ultraviolet light emitted from a metal halide lamp under the condition of 80 W/cm, 80° C., so as to prepare a polymer dispersion type liquid crystal display cell. The particle size of the polymer matrix material was found to be distributed such that two peaks each having a half value width of 0.8 μm were included within a range of between 1.0 μm and 2.0 μm.

The contrast and the response speed of the polymer dispersion type liquid crystal display cell thus obtained were measured, with the result that the contrast was satisfactory, i.e., $V_{10}/V_{90}$ was 0.25, and the rising (0 to 90%) was also satisfactory.

EXAMPLE 10

A raw material mixture was prepared first by mixing two kinds of polymer matrix materials, i.e., 100 parts by weight of n-butyl acrylate and 200 parts by weight of acrylic oligomer, 400 parts by weight of E-44, and 10 parts by weight of 2-hydroxy-2-methyl-1-phenylpropane-1-one, which was used as a photopolymerization initiator. Then, two glass substrates each having an ITO film formed on the surface by means of vapor deposition were disposed to face each other with a spacer of 10 μm interposed therebetween, and the resin mixture noted above was filled into the free space between the two glass substrates. The resultant assembly was irradiated for 3 minutes with an ultraviolet light emitted from a metal halide lamp under the condition of 30 W/cm, 60° C., followed by an additional irradiation for 5 minutes with an ultraviolet light emitted from a metal halide lamp under the condition of 30 W/cm, 60° C., so as to prepare a polymer dispersion type liquid crystal display cell. The particle size of the polymer matrix material was found to be distributed such that two peaks each having a half value width of 0.7 μm were included within a range of between 1.0 μm and 1.5 μm.

The contrast and the response speed of the polymer dispersion type liquid crystal display cell thus obtained were measured, with the result that the contrast was satisfactory, i.e., $V_{10}/V_{90}$ was 0.2, and the rising (0 to 90%) was also satisfactory.

EXAMPLE 11

One gram of liquid crystal 2293 (trade name of a liquid crystal manufactured by merk Inc.) and 0.2 g of sodium undecylenate were mixed within 10 cc of acetone, and the resultant mixture was dripped into 100 cc of water while vigorously stirring the resultant solution. When the solution was emulsified, 0.05 g of potassium persulfate was added to the solution, followed by carrying out a polymerization reaction while vigorously stirring the solution. After completion of the reaction, the reaction mixture was filtered, washed with water and, then, dried so as to obtain powdery liquid crystal microcapsules.

On the other hand, 1 g of polyester manufactured by Aldrich Inc., which was used as polymer matrix material, was dissolved in chloroform so as to prepare a solution containing 10% by weight of the polyester. Then, 0.5 g of the liquid crystal microcapsules were added to the polyester solution, and the resultant system was promptly stirred and evaporated so as to remove the solvent and, thus, to obtain a film. Further, the film thus prepared was held between two glass substrates each having an ITO film formed on the surface by means of vapor deposition to prepare a polymer dispersion type liquid crystal display cell including a film having a thickness of 10 μm.

The driving voltage and the response speed of the polymer dispersion type liquid crystal display cell thus obtained were measured as in Example 1. The rising time (0 to 90%) was found to be 15 mS, and the decaying time (100 to 10%) was found to be 5 mS. Further, the driving voltage was found to be 10V.

An additional experiment was conducted in which the polyester noted above and the liquid crystal 2293 noted above were simply mixed within chloroform. In this case, phase separation did not take place, making it possible to prepare a polymer dispersion type liquid crystal.

EXAMPLE 12

One gram of liquid crystal 2293 and 0.2 g of sodium undecylenate were mixed within 10 cc of acetone, and the resultant mixture was dripped into 100 cc of water while vigorously stirring the resultant solution. When the solution was emulsified, 0.05 g of potassium persulfate was added to the solution, followed by carrying out a polymerization reaction while vigorously stirring the solution. After completion of the reaction, the reaction mixture was filtered, washed with water and, then, dried so as to obtain powdery liquid crystal microcapsules.

On the other hand, 1 g of polystyrene, which was used as polymer matrix material, was dissolved in chloroform so as to prepare a solution containing 15% by weight of the polystyrene. Then, 0.5 g of the liquid crystal microcapsules were added to the polystyrene solution, and the resultant system was promptly stirred and evaporated so as to remove the solvent and, thus, to obtain a film. Further, the film thus prepared was held between two glass substrates each having an ITO film formed on the surface by means of vapor deposition to prepare a polymer dispersion type liquid crystal display cell including a film having a thickness of 10 $\mu$m.

The driving voltage and the response speed of the polymer dispersion type liquid crystal display cell thus obtained were measured as in Example 1. The rising time (0 to 90%) was found to be 25 mS, and the decaying time (100 to 10%) was found to be 7 mS. Further, the driving voltage was found to be 10V.

An additional experiment was conducted in which the polyester noted above and the liquid crystal 2293 noted above were simply mixed within chloroform. In this case, phase separation did not take place, making it possible to prepare a polymer dispersion type liquid crystal.

As described above in detail, the present invention provides a polymer dispersion type liquid crystal display element which exhibits a markedly improved response speed, which can be operated with a low driving voltage, and which permits a high contrast. Naturally, the liquid crystal display element of the present invention is adapted for an active matrix driving. In order to produce the prominent effects described above, the electrical conductivity of the polymer matrix material is adjusted so as to permit the ratio in resistivity of the liquid crystal material to the polymer matrix material to fall within a predetermined range. Also, the particle diameters of the polymer matrix material or the liquid crystal material are intentionally distributed over a wide range so as to control the threshold value. Further, the liquid crystal material is formed into microcapsules in advance and, then, the microcapsules are dispersed in the polymer matrix material. The use of the liquid crystal microcapsules permits widening the scope of selection of the polymer matrix material and the liquid crystal material.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal display element, comprising a pair of substrates and a film held between the substrates, said film being prepared by dispersing liquid crystal material in a polymer matrix material having a resistivity of not greater than $10^{10}\Omega\cdot$cm, and a ratio $\rho_{LC}/\rho_p$, in which $\rho_{LC}$ denotes a resistivity ($\Omega\cdot$cm) of the liquid crystal material and $\rho_p$ represents a resistivity ($\Omega\cdot$cm) of the polymer matrix material, falling within a range of between 1 and $10^5$, ($1 \leq \rho_{LC}/\rho_p \leq 10^5$).

2. The liquid crystal display element according to claim 1, wherein said polymer matrix material contains electrically conductive fine particles.

3. The liquid crystal display element according to claim 2, wherein said electrically conductive fine particles are made of material selected from the group consisting of metal, carbon, metal oxide having electrical conductivity, charge transfer complex, and organic electrolyte.

4. The liquid crystal display element according to claim 2, wherein said electrically conductive fine particles have an average particle diameter falling within a range of between 0.01 $\mu$m and 3 $\mu$m.

5. The liquid crystal display element according to claim 2, wherein said electrically conductive fine particles are dispersed in the polymer matrix in the form of microcapsules prepared by encapsulating said fine particles with a material which is not miscible with a liquid crystal material.

6. A liquid crystal display element according to claim 1, comprising a pair of substrates and a film held between the substrates, said film being prepared by dispersing a liquid crystal material in a polymer matrix material, and a protective layer being formed to cover the outer surface of the liquid crystal material.

7. The liquid crystal display element according to claim 6, wherein the the protective layer is made of a polymer obtained by polymerizing a surfactant series monomer.

8. The liquid crystal display element according to claim 1, wherein said polymer matrix contains an electrically conductive polymer.

9. The liquid crystal display element according to claim 8, wherein said electrically conductive polymer is a polymer selected from the group consisting of conjugated $\pi$ aromatic polymer, polypyrrole, poly (N-substituted dipyrrole), poly (3,4-2 substituted pyrrole), polypyridine, polyphenylene, polythiophene, poly (3,4-2 substituted thiophene), polyaniline, polyazulene, polyvinylene, polyvinylcarbozol, poly (N-substituted carbazol), polyselenophene, polyfuran, poly (2,5-furylenevinylene), polybenzothiophene, poly (2,5-thienylenevintlene), polybenzofuran, polyindole, polyisothionaphthene, polypyridazine, polyacetylene, and polysilane.

10. The liquid crystal display element according to claim 1, wherein at least two peaks each having a half value width of at least 0.5 $\mu$m is present within a range of between 0.5 $\mu$m and 2.5 $\mu$m in the particle size distribution of the polymer matrix material or the liquid crystal material.

11. The liquid crystal display element according to claim 10, wherein at least 80% of the particles have particle diameters falling within a range of between 0.5 $\mu$m and 2.5 $\mu$m.

* * * * *